US007925962B2

(12) United States Patent
Huang

(10) Patent No.: US 7,925,962 B2
(45) Date of Patent: *Apr. 12, 2011

(54) DVB-H SYSTEM AND METHOD FOR PERFORMING FORWARD ERROR CORRECTION

(75) Inventor: Tung-Hao Huang, Tai-Chung (TW)

(73) Assignee: Mediatek USA Inc., San Jose, CA (US)

( * ) Notice: Subject to any disclaimer, the term of this patent is extended or adjusted under 35 U.S.C. 154(b) by 1120 days.

This patent is subject to a terminal disclaimer.

(21) Appl. No.: 11/624,224

(22) Filed: Jan. 18, 2007

(65) Prior Publication Data

US 2008/0178051 A1 Jul. 24, 2008

(51) Int. Cl.
*H03M 13/00* (2006.01)
(52) U.S. Cl. .................. 714/785; 714/776; 714/748
(58) Field of Classification Search .......... 714/785, 714/776, 748, 752, 704
See application file for complete search history.

(56) References Cited

U.S. PATENT DOCUMENTS

| 7,590,193 B2 * | 9/2009 | Han ..................... 375/326 |
| 7,644,343 B2 * | 1/2010 | Gubbi et al. ............ 714/776 |
| 2007/0019578 A1 * | 1/2007 | Meiri .................... 370/311 |
| 2007/0186143 A1 * | 8/2007 | Gubbi et al. ............ 714/776 |
| 2007/0281757 A1 * | 12/2007 | Iguchi et al. ............ 455/574 |
| 2008/0009251 A1 * | 1/2008 | Wahl et al. ............ 455/182.1 |
| 2008/0072259 A1 * | 3/2008 | Seo et al. ............... 725/50 |

* cited by examiner

*Primary Examiner* — Fritz Alphonse
(74) *Attorney, Agent, or Firm* — Winston Hsu; Scott Margo

(57) ABSTRACT

A Digitally Video Broadcasting—Handheld (DVB-H) system for performing forward error correction includes: a tuner for receiving a data stream; a base-band receiver, coupled to the tuner, for extracting data bytes of a multi-protocol-encapsulation forward-error-correction (MPE-FEC) frame, and performing syndrome calculation on each extracted data byte to determine a corresponding partial syndrome; and an embedded memory, coupled to the base-band receiver, for accumulating each partial syndrome to determine a complete syndrome; wherein once all syndromes of the MPE-FEC frame are received, the base-band receiver determines corresponding error values and utilizes the error values to forward error correct the MPE-FEC frame.

20 Claims, 5 Drawing Sheets

DVB-H SYSTEM AND METHOD FOR PERFORMING FORWARD ERROR CORRECTION

BACKGROUND

The continuing demand for more sophisticated mobile devices has encouraged manufacturers to enable handheld devices such as mobile phones to support multimedia streaming content. A key standard in this technology is the DVB-H standard, which can transmit digital television signals and Internet services. As handheld devices may experience reception problems in some environments, manufacturers have introduced an additional error correction scheme known as multi-protocol-encapsulation forward-error-correction (MPE-FEC).

Please refer to FIG. 1 and FIG. 2 together. FIG. 1 is a diagram of a first related art DVB-H system 100. The DVB-H system 100 comprises a tuner 110, a base-band receiver 120, a host sub-system 130, an embedded memory 140, a media player 150, and an external memory 160. FIG. 2 is a diagram of an MPE-FEC frame. The MPE-FEC frame is a matrix made up of 255 columns by 1024 rows (please note that the number of rows is flexible, and an MPE-FEC frame may have 256, 512, 768 or 1024 rows) where the first 191 columns comprise application data (an OSI Layer 3 datagram, also known as an IP datagram), and the last 64 columns contain Reed-Solomon (RS) code parity data. Data is received byte by byte in a vertical direction, so each column is built up before data of a next column is received. Each row holds an RS (255,191,64) codeword, where a 64 bytes syndrome can be derived from each codeword.

The forward error correction process takes place in four stages. Initially, once entire data of an MPE-FEC frame is received, 64-byte syndromes respectively corresponding to each codeword of the MPE-FEC frame will be generated. Next, error locations will be calculated, and error values associated with the respective error locations determined. Finally, utilizing the error locations, the error values will be added to corresponding data bytes in the MPE-FEC frame to complete the process of forward error correction.

In the DVB-H system 100, the tuner 110 receives a data stream, and the base-band receiver 120 converts the data stream to an MPEG-2 transport stream, extracts bytes of the MPE-FEC frame, and stores them in the embedded memory 140. Once all the bytes of the MPE-FEC frame are received, the base-band receiver 120 calculates the corresponding syndromes, and then utilizes the syndromes to calculate the error locations and error values (full RS decoding) or utilizes a CRC check to find erasure information (e.g. error locations), and determines the error values from the erasure information (half RS decoding). The error values are added to the MPE-FEC frame in the embedded memory 140 to correct errors, and the resultant IP datagrams sent to the host sub-system 130 for further processing. As the entire MPE-FEC frame must be stored in the embedded memory 130, a 2 Mbit memory is required for storing a 255 bytes×1024 MPE-FEC frame. As this memory is on-chip, the huge size creates problems such as increased die size and degraded yield rate.

In order to avoid the use of such a large embedded memory (e.g. an SRAM), other related art DVB-H systems do not include an embedded memory, and instead store the MPE-FEC frame in the external memory (e.g. a DRAM). Please refer to FIG. 3. FIG. 3 is a diagram of a second related art DVB-H system 300. The DVB-H system 300 comprises a tuner 310, a base-band receiver 320, a host sub-system 340, a media player 350, and an external memory 360. A data stream is received by the tuner 310, then converted to an MPEG-2 transport stream by the base-band receiver 320, and data bytes of an MPE-FEC frame are extracted and sent to the external memory 360. Once all the data bytes are received, each codeword in the MPE-FEC frame is extracted and sent to the base-band receiver 320 for RS decoding. As the error corrected codeword must then be sent back to the host sub-system 340, there is a bi-directional bus between the base-band receiver 320 and the host sub-system 340. Sending the entire MPE-FEC frame across the bus creates very heavy traffic. A greater disadvantage of this conventional method, however, is that all stages of the RS decoding process must be performed in an interleaved sequence, only enabling single byte access of the DRAM and therefore resulting in very inefficient DRAM bandwidth utilization due to a large proportion of overhead required for each DRAM access. The overhead is the clock cycles upfront specifying command, row address and column address before the actual data transaction cycles take place. A burst DRAM access is preferred since the proportion of overhead is much smaller than single byte access.

SUMMARY

Systems and methods for performing forward error correction on a DVB-H system that overcomes the disadvantages of the related art are provided.

A DVB-H system that enables forward error correction is disclosed. The DVB-H system comprises: a tuner for receiving a data stream; a base-band receiver, coupled to the tuner, for extracting data bytes of an MPE-FEC frame, and performing syndrome calculation on each extracted data byte to determine a corresponding partial syndrome; and an embedded memory, coupled to the base-band receiver, for accumulating each partial syndrome to determine a complete syndrome; wherein once all syndromes of the MPE-FEC frame are received, the base-band receiver determines corresponding error values and utilizes the error values to forward error correct the MPE-FEC frame.

A forward error correction method comprises: receiving a data stream; continuously extracting data bytes of an MPE-FEC frame in the data stream; performing syndrome calculation on each extracted data byte of the MPE-FEC frame to determine a corresponding partial syndrome; accumulating each partial syndrome to determine complete syndromes; once all syndromes of the MPE-FEC frame are determined, determining error values corresponding to each codeword; and utilizing the error values to forward error correct the MPE-FEC frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
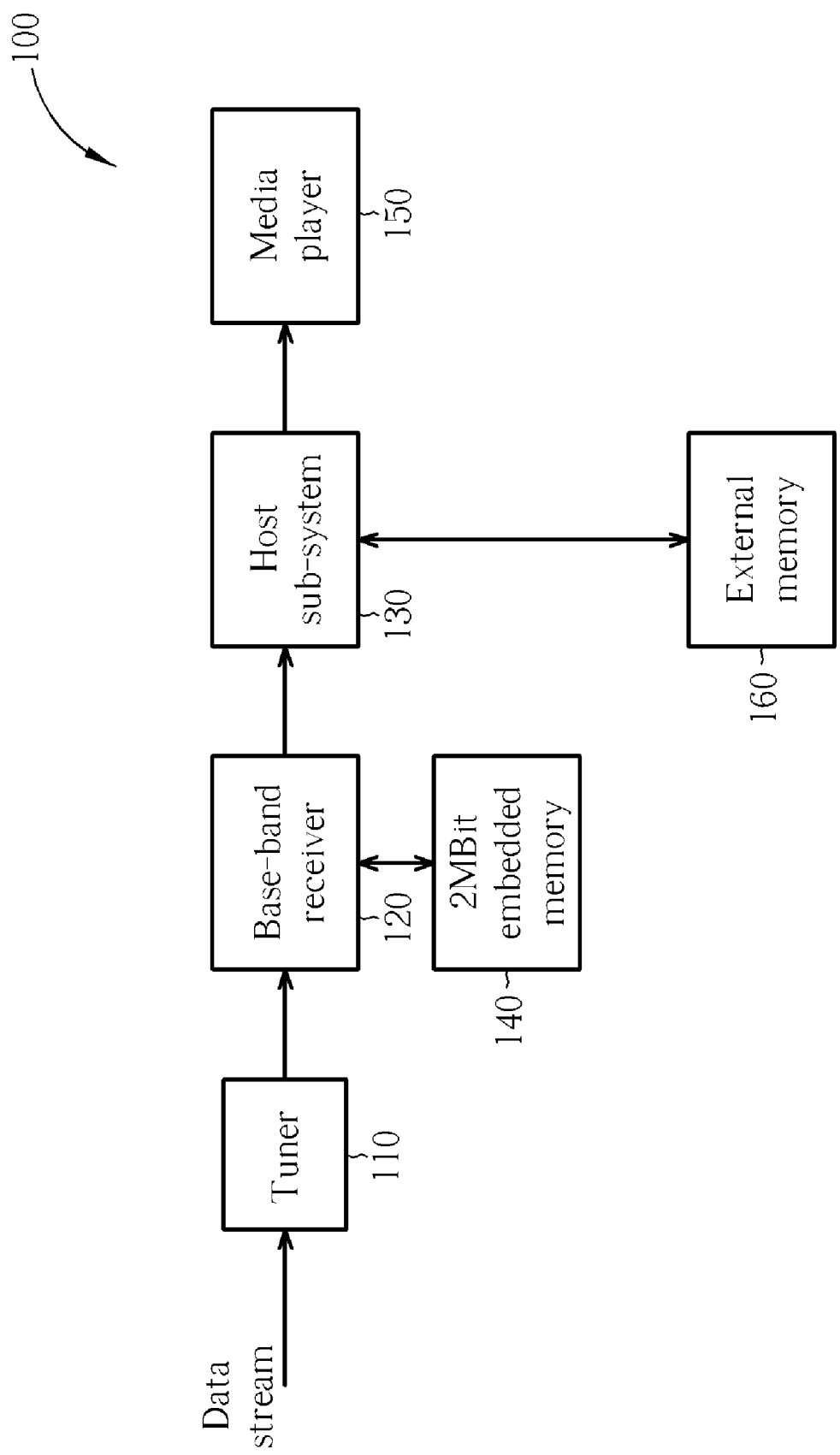
FIG. 1 is a diagram of a first related art DVB-H system.
Figure 2:
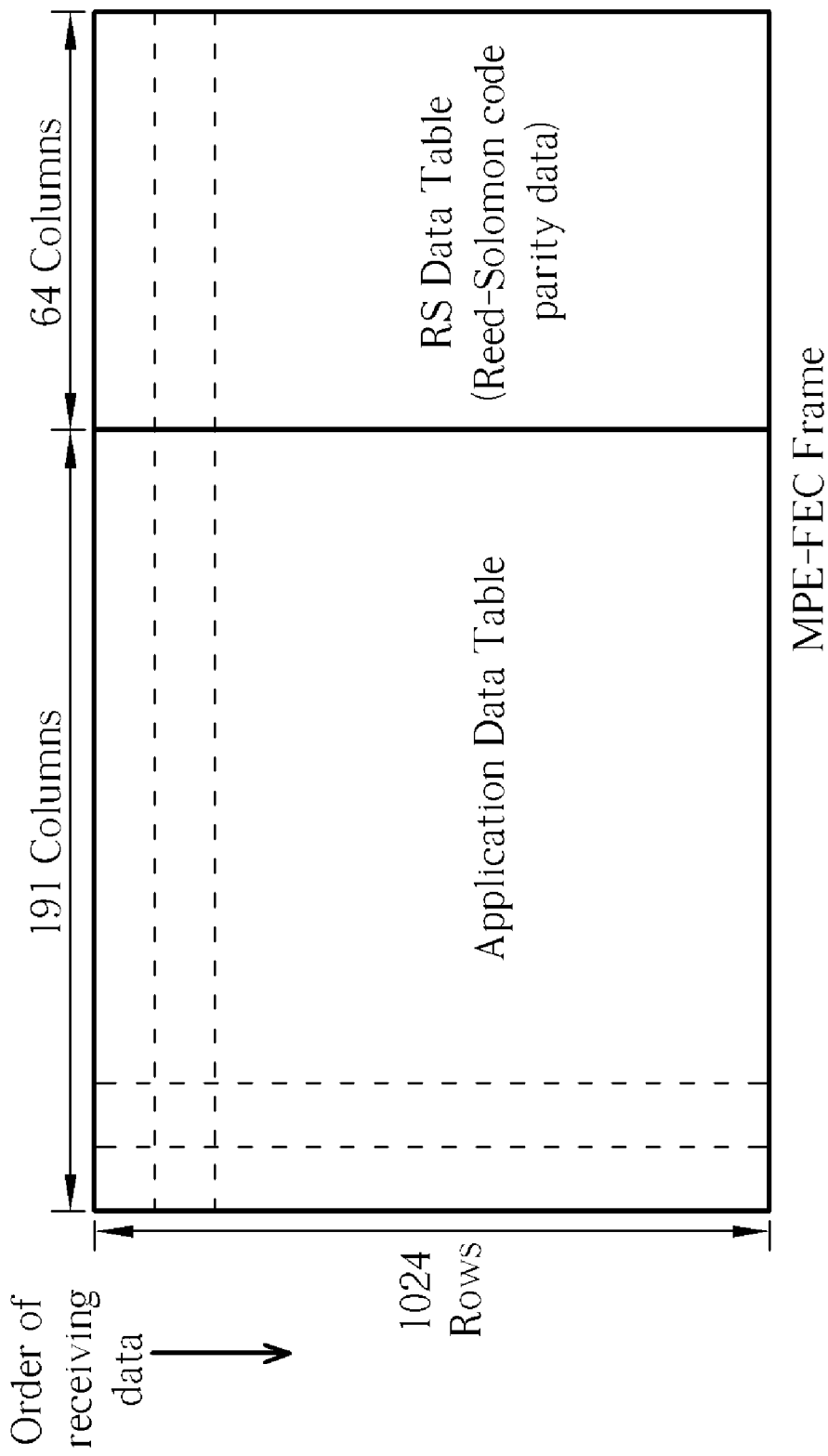
FIG. 2 is a diagram showing the structure of an MPE-FEC frame according to the related art.
Figure 3:
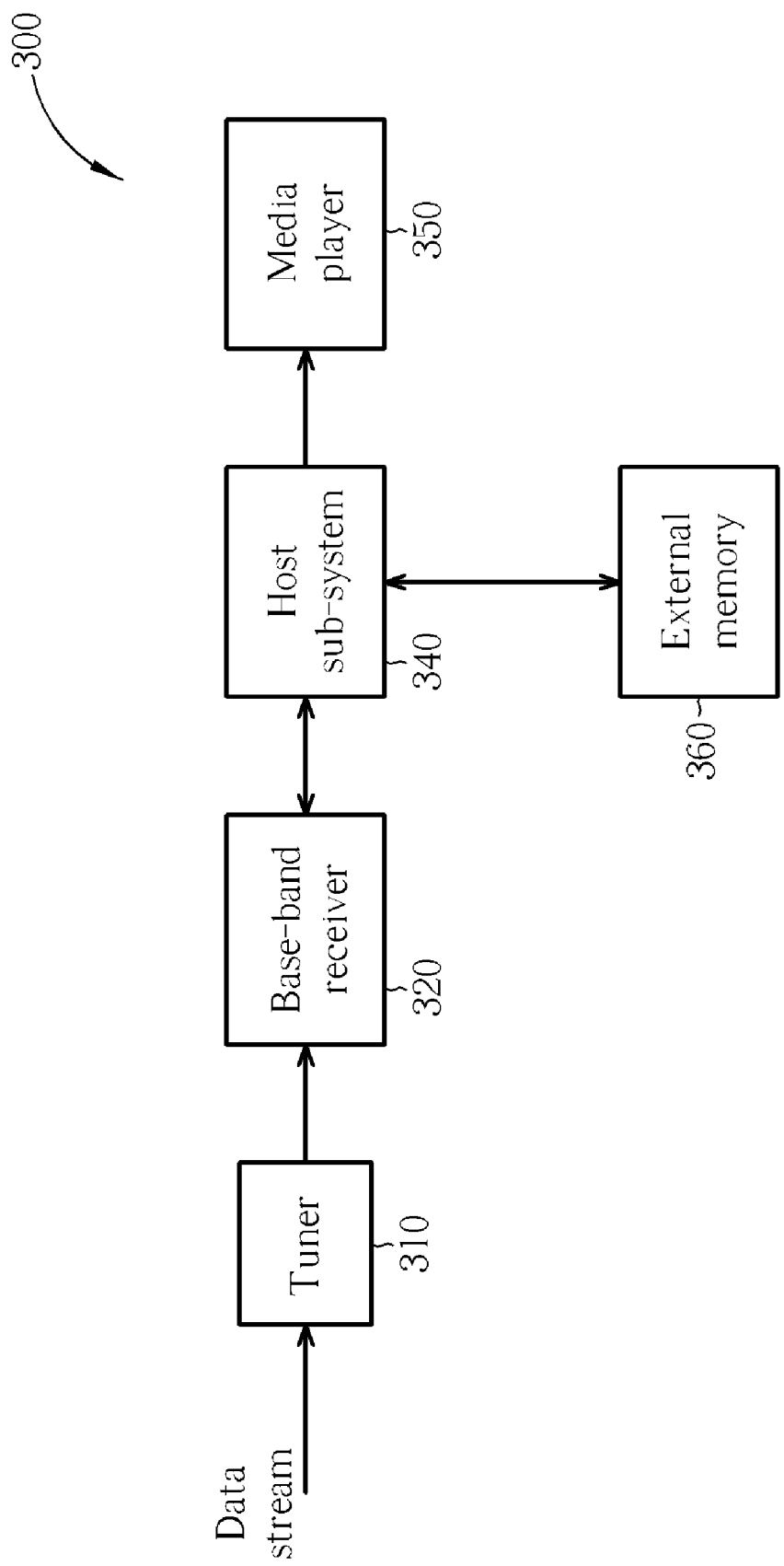
FIG. 3 is a diagram of a second related art DVB-H system.
Figure 4:
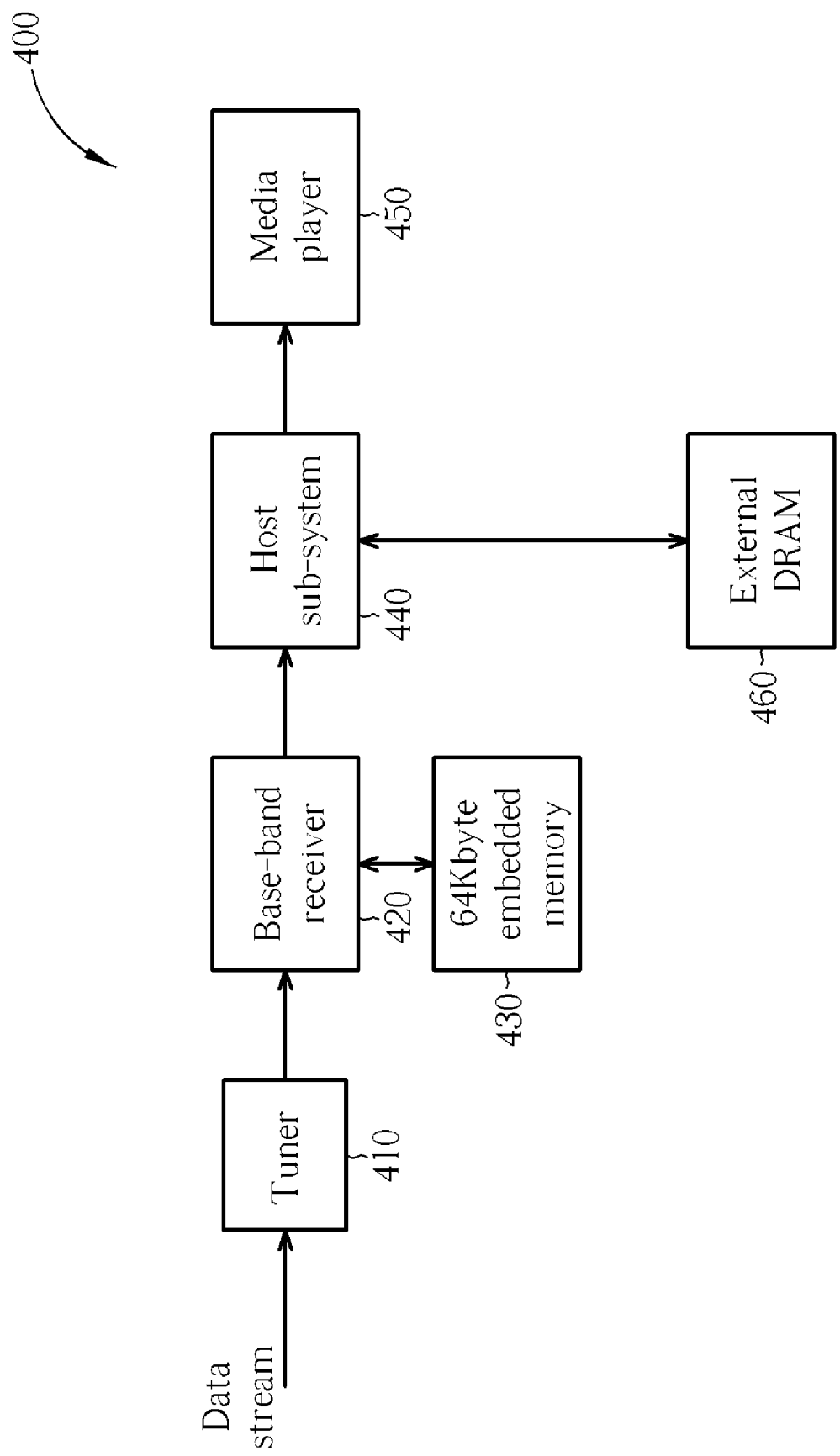
FIG. 4 is a diagram of a DVB-H system according to an embodiment of the present invention.

Please refer to FIG. 4. FIG. 4 is a diagram of a DVB-H system 400 according to an exemplary embodiment of the present invention. The DVB-H system 400 comprises: a tuner 410; a base-band receiver 420; an embedded memory 430; a host sub-system 440; a media player 450; and an external memory, which is implemented by an external DRAM 460 in this embodiment. The difference between this DVB-H system 400 and the DVB-H system 100 in FIG. 1 is that the embedded memory 430 has a maximum data storage capacity of 64 Kbytes, which is approximately a quarter the size of the embedded memory 130 in FIG. 1. This is because the embedded memory 430 is only utilized for storing syndromes of the MPE-FEC frame, as opposed to storing the whole MPE-FEC frame. It should also be noted that the functions of the base-band receiver 420, the host sub-system 440, and the external memory 460 differ from the functions of their respective components in FIG. 1 and FIG. 2. These differences, and the detailed method of the claimed invention will be described below.

Initially, a data stream is received by the tuner 410. This data stream is then passed to the base-band receiver 420, where it is converted to an MPEG-2 transport stream, and data bytes of an embedded MPE-FEC frame are extracted. Only the application data table (the first 191 columns) of MPE-FEC frame is sent to the external memory (i.e. the external DRAM 460). The application data table carries the IP datagram, whereas the RS data table (the last 64 columns) carries parity bytes of FEC code. The parity data carried by the RS data table is only used for syndrome calculation, and it can be discarded in the base-band receiver 420 after syndrome calculation is performed. The base-band receiver 420 also performs syndrome calculation on each extracted data byte at the same time. As mentioned above, the syndrome of a 255-byte RS (255,191,64) codeword is 64 bytes in size, and a partial 64-byte syndrome can be calculated when each data byte is received by the base-band receiver 420. After the 64-byte partial syndrome corresponding to the first data byte of a codeword is calculated, it is stored in the embedded memory 430, and when the 64-byte partial syndrome corresponding to the second data byte is calculated, the partial syndrome corresponding to the first data byte is read from the embedded memory 430, and the two partial syndromes are added to update the partial syndrome stored in the embedded memory 430. In this way, once all data bytes of the MPE-FEC frame are received, the corresponding final syndromes are already generated. The base-band receiver then accesses the embedded memory 430, extracts the syndromes, and utilizes the syndromes to generate corresponding error values of found error locations. Please note that error locations can be found directly from the syndromes, or obtained by utilizing a CRC in the MPEG-2 transport streams. If the error location is derived from the transport stream in the front-end, for example, an error detection module in the tuner, more error locations can be found compared to deriving the error locations from the syndromes. Once the error values for each codeword are generated, they may be stored in the same embedded memory 430 by overwriting the syndromes since the syndromes are needed no more. In this way the memory space of the embedded memory can be fully utilized. Please note that the error values may be sent directly to the host sub-system 440, and this also falls within the scope of the present invention. First storing the error values in the embedded memory 430 has some advantages of DRAM access, however. Although error values are calculated and stored in a codeword by codeword manner (horizontal), they are extracted in an IP-datagram sequence (vertical, de-interleaved order) and sent to the host sub-system 440 for data correction. The information of error locations obtained from the MPEG-2 transport stream or derived from the syndromes is also sent to the host sub-system 440 in advance. The host sub-system 440 extracts received data bytes of the MPE-FEC frame from the external memory (i.e. the external DRAM 460) in a de-interleaved sequence, and refers to the error locations to combine the error values with the MPE-FEC frame. This forward error correction process only requires a mono-directional bus between the base-band receiver 420 and host sub-system 440. Furthermore no single-byte DRAM access is needed. All DRAM access is burst access. Thus the most efficient DRAM bandwidth utilization can be achieved.

The process of on-the-fly syndrome calculation will herein be discussed in more detail. Please refer to FIG. 2 again. As can be seen from the diagram, the MPE-FEC frame is comprised of 255 columns by 1024 rows, where each row contains an RS (255,191,64) codeword. Each codeword generates 64 bytes of syndrome. As data is not received in an interleaved (row by row) form, the related art must wait until the whole MPE-FEC frame is received before commencing syndrome calculation. The disclosed base-band receiver 420 calculates a partial syndrome of a first data byte (e.g. row 1 column 1) and writes it to the embedded memory 430. It then proceeds to do this for the first data byte of every row. When a second data byte of the first row is received (i.e. row 1 column 2), the base-band receiver 420 calculates a corresponding partial syndrome and then also reads out the partial syndrome corresponding to row 1 column 1, and combines it with the row 1 column 2 partial syndrome to generate an accumulated partial syndrome, and then overwrites the stored partial syndrome with the accumulated partial syndrome. When a row 2 column 2 data byte is received, a corresponding partial syndrome is similarly calculated by the base-band receiver 420, used to read out the row 2 column 1 entry in the embedded memory 430, combined to generate an accumulated partial syndrome and then stored to the embedded memory 430 by overwriting the row 2 column 1 information. The final syndrome corresponding to row 1 can be derived when the partial syndrome corresponding to row 1 column 255 is calculated and added to the accumulated partial syndrome corresponding to row 1 column 254. The final syndromes, 64 bytes for each codeword, are still written back to the embedded memory 430 for the subsequent error value calculation.

Once the entire MPE-FEC frame has been received, it means the syndrome calculation is also finished. The base-band receiver 420 can start the error value calculation immediately. The on-the-fly syndrome calculation advantageously enables steps 1) and 2) of the forward error correction process (receiving MPE-FEC frame data and calculating corresponding syndromes respectively) to be performed simultaneously. The error values corresponding to each codeword are calculated based on the 64-byte syndrome derived from that codeword. Once error values are derived, the syndromes become useless. Since the maximum number of error bytes is also 64 bytes for each codeword, the same embedded memory can be used to store all the error values for the whole MPE-FEC frame. As mentioned above, however, the error values are not limited to being stored in the embedded memory 430, and can be directly sent to the host sub-system 440. The main advantage of storing all of the error values is that step 4 (data correcting) can be performed in an IP-datagram sequence (vertical), instead of an interleaved sequence.

The calculated error values can then be forwarded to the host sub-system 440, which also extracts the MPE-FEC frame data from the external DRAM 460, and performs the final stage of forward error correction by utilizing the error locations to determine bytes in the MPE-FEC frame that have errors, and then combines received bytes with the corresponding error values. By performing this final step in the host sub-system 440, the total data of the MPE-FEC frame does not need to be sent to the base-band receiver 420, and therefore only a mono-directional bus is needed between the two components.

Figure 5:
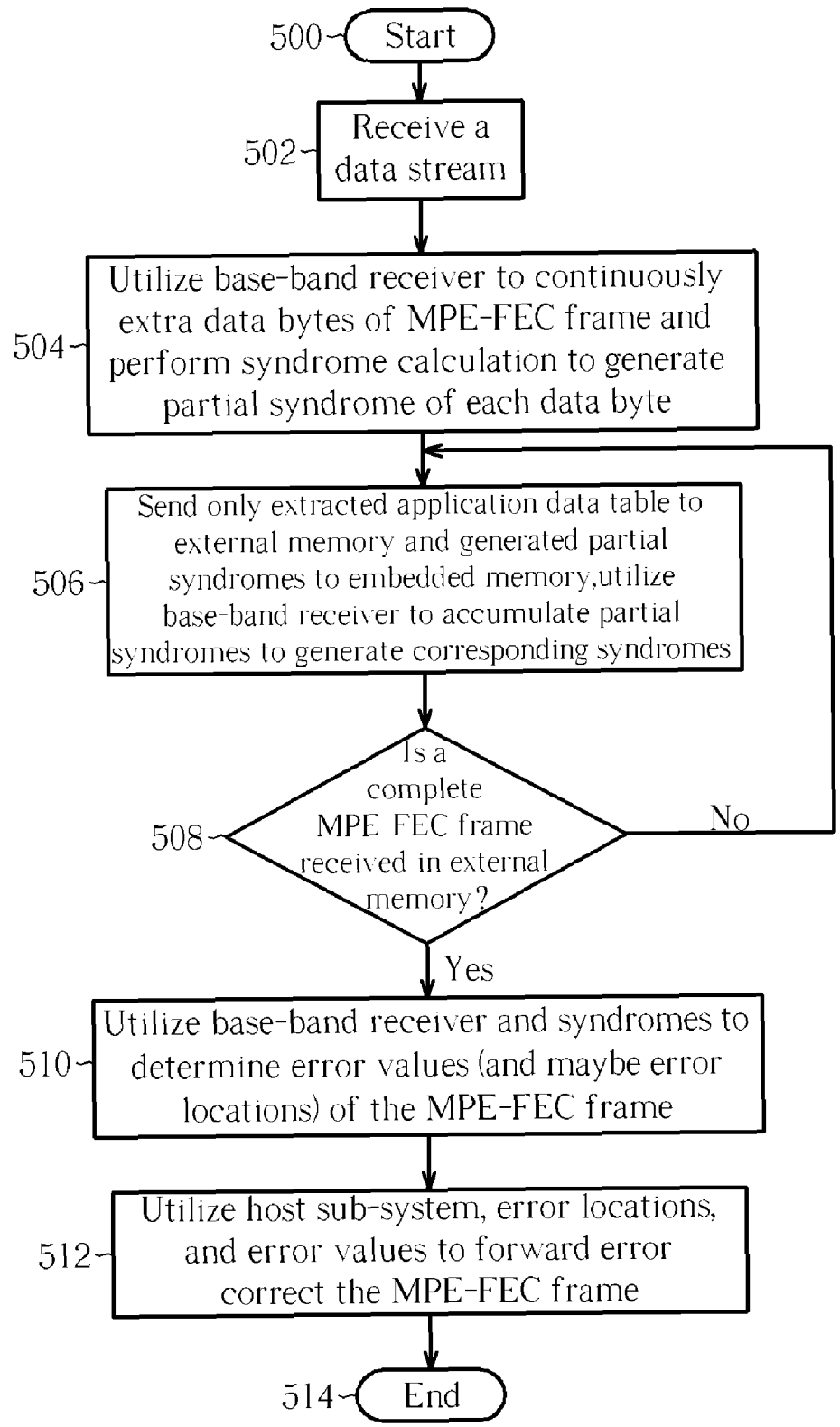
FIG. 5 is a flowchart of the method of the present invention.

Please refer to FIG. 5. FIG. 5 is a flowchart of the method of the present invention. The steps are as follows:

Step 500: Start;
Step 502: Receive a data stream;
Step 504: Utilize the base-band receiver to continuously extract data bytes of an MPE-FEC frame and perform syndrome calculation to generate a partial syndrome of each data byte;
Step 506: Send only the extracted application data table (the first 191 columns) of MPE-FEC frame to an external memory and the generated partial syndromes to an embedded memory, and utilize the base-band receiver to accumulate partial syndromes to generate corresponding syndromes;
Step 508: Is a complete MPE-FEC frame received in the external memory? If yes go to Step 510; if no go back to Step 506;
Step 510: Utilize the base-band receiver and the syndromes stored in the embedded memory to determine error values (and maybe error locations) of the MPE-FEC frame;
Step 512: Utilize the host sub-system, error locations, and error values to forward error correct the MPE-FEC frame in an IP-datagram sequence;
Step 514: End.

It should be noted that the embedded memory 430 can only store the syndromes, and this modification still falls within the scope of the present invention. Storing error values in the embedded memory 430, however, means that error correction can be performed in a de-interleaved sequence (or IP-datagram sequence). Error locations belonging to the same codeword reside in non-continuous memory space. If all error values are not temporarily stored in the embedded memory but immediately used to perform error correction then the error correction must be performed codeword by codeword in an interleaved sequence, therefore resulting in single byte DRAM access. In this invention, since all error values are stored in the same embedded memory 430 (by overwriting the syndromes) then error correction can be performed in a de-interleaved sequence, enabling continuous burst DRAM access, which saves DRAM bandwidth. Another advantage of de-interleaved data correcting is that since the corrected data bytes are already in the IP-datagram sequence, they can be directly fed into an IP processing unit for further processing without being written back to the DRAM 460. If data is corrected in an interleaved sequence, this means that corrected data bytes have to be put back into the DRAM 460 in an interleaved order and then read out again in an IP datagram sequence.

By performing syndrome calculation on the fly, the speed of error correction is considerably increased. Storing syndromes in the embedded memory 440 rather than the entire MPE-FEC frame means that a memory only a quarter the size of the related art embedded memory is needed. Furthermore, overwriting syndromes in the embedded memory 440 with calculated error values enables error correction to be performed in a de-interleaved form, thereby enabling continuous-burst DRAM access rather than single-byte access, considerably increasing the DRAM access efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing forward error correction in a Digitally Video Broadcasting—Handheld (DVB-H) system, the method comprising:
   receiving a data stream;
   continuously extracting data bytes of a multi-protocol-encapsulation forward-error-correction (MPE-FEC) frame in the data stream;
   performing syndrome calculation on each extracted data byte of the MPE-FEC frame to determine a corresponding partial syndrome;
   accumulating each partial syndrome to determine complete syndromes;
   once all syndromes of the MPE-FEC frame are determined, determining corresponding error values; and
   utilizing the error values to forward error correct the MPE-FEC frame.

2. The method of claim 1, wherein the step of accumulating each partial syndrome to determine complete syndromes comprises:
   providing the DVB-H system with an embedded memory;
   continuously sending partial syndromes to the embedded memory; and
   accumulating a sent partial syndrome with a specific entry in the embedded memory until a complete syndrome is derived.

3. The method of claim 2, wherein the step of once all syndromes of the MPE-FEC frame are determined, determining corresponding error values further comprises:
   overwriting the syndromes in the embedded memory with the error values.

4. The method of claim 2, wherein the step of once all syndromes of the MPE-FEC frame are determined, determining corresponding error values further comprises:
   providing a host sub-system; and
   sending the error values directly to the host sub-system.

5. The method of claim 2, wherein the step of accumulating a sent partial syndrome with a specific entry in the embedded memory until a complete syndrome is derived comprises:
   reading the specific entry in the embedded memory;
   accumulating the partial syndrome with the read specific entry to generate an accumulated syndrome; and
   overwriting the specific entry with the accumulated syndrome until the complete syndrome is derived.

6. The method of claim 2, wherein the embedded memory has a maximum data storage capacity equal to the size of parity data in the MPE-FEC frame.

7. The method of claim 3, wherein the step of continuously extracting data bytes of an MPE-FEC frame in the data stream further comprises:
   providing the DVB-H system with an external memory; and
   continuously sending the extracted data bytes to the external memory.

8. The method of claim 7, wherein the step of utilizing the error values to forward error correct the MPE-FEC frame comprises:
   extracting the error values from the embedded memory;
   extracting the data bytes from the external memory; and
   combining the extracted error values with the extracted data bytes to perform forward error correction.

9. The method of claim 8, wherein the step of combining the extracted error values with the extracted data bytes can be performed in a de-interleaved sequence.

10. The method of claim 4, wherein the step of continuously extracting data bytes of an MPE-FEC frame in the data stream further comprises:

providing the DVB-H system with an external memory; and continuously sending the extracted data bytes to the external memory.

11. The method of claim 10, wherein the step of utilizing the error values to forward error correct the MPE-FEC frame comprises:

extracting the data bytes from the external memory; and combining the extracted error values with the extracted data bytes to perform forward error correction.

12. A Digitally Video Broadcasting—Handheld (DVB-H) system for performing forward error correction, the DVB-H system comprising:

a tuner for receiving a data stream;

a base-band receiver, coupled to the tuner, for extracting data bytes of a multi-protocol-encapsulation forward-error-correction (MPE-FEC) frame, and performing syndrome calculation on each extracted data byte to determine a corresponding partial syndrome; and an embedded memory, coupled to the base-band receiver, for accumulating each partial syndrome to determine a complete syndrome;

wherein once all syndromes of the MPE-FEC frame are determined, the base-band receiver determines corresponding error values and utilizes the error values to forward error correct the MPE-FEC frame.

13. The DVB-H system of claim 12, wherein the embedded memory continuously receives partial syndromes from the base-band receiver, and accumulates each received partial syndrome with a specific entry in the embedded memory until a complete syndrome is derived.

14. The DVB-H system of claim 12, wherein the base-band receiver overwrites the syndromes in the embedded memory with the error values.

15. The DVB-H system of claim 14, wherein the error values can be combined with the extracted data bytes in a de-interleaved sequence.

16. The DVB-H system of claim 13, wherein the base-band receiver reads the specific entry from the embedded memory, accumulates a received syndrome with the specific entry to generate an accumulated syndrome, and overwrites the specific entry with the accumulated syndrome.

17. The DVB-H system of claim 12, wherein the embedded memory has a maximum data storage capacity equal to the size of parity data in the MPE-FEC frame.

18. The DVB-H system of claim 12, further comprising:

an external memory, coupled to the base-band receiver, for continuously receiving the extracted data bytes of the MPE-FEC frame.

19. The DVB-H system of claim 18, further comprising:

a host sub-system, coupled between the embedded memory and the base-band receiver, for receiving extracted error values from the base-band receiver, extracting the data bytes of the MPE-FEC frame from the external memory, and combining the error values with the extracted data bytes to perform forward error correction.

20. The DVB-H system of claim 19, wherein the error values are directly sent to the host sub-system.

* * * * *